June 7, 1955 R. V. BAUM ET AL 2,710,348

STABILIZED ELECTRONIC MULTIPLIER

Filed July 17, 1953 2 Sheets-Sheet 1

INVENTOR.
CHARLES D. MORRILL
RICHARD V. BAUM

BY

A H Oldham
ATTORNEY

STABILIZED ELECTRONIC MULTIPLIER

Filed July 17, 1953 2 Sheets-Sheet 2

INVENTOR.
CHARLES D. MORRILL
RICHARD V. BAUM
BY
A. H. Oldham
ATTORNEY 2,710,348

STABILIZED ELECTRONIC MULTIPLIER

Richard V. Baum, Phoenix, Ariz., and Charles D. Morrill, Cuyahoga Falls, Ohio, assignors to Goodyear Aircraft Corporation, Akron, Ohio, a corporation of Delaware Application July 17, 1953, Serial No. 368,632

11 Claims. (Cl. 250—27)

This invention relates to an electronic computing system, and, more particularly, to an electronic circuit which will algebraically multiply at least two input variables.

It is the general object of this invention to provide an electronic multiplier which produces an output voltage having an amplitude instantaneously proportional to the algebraic product of the amplitudes of at least two input variables.

Another object of this invention is the provision of an electronic multiplier which accommodates both positive and negative input voltages and produces an output voltage of the proper algebraic sign.

A further object of this invention is the provision of a multiplier which is wholly electronic in its operation, thus obviating the use of precision potentiometers or the extensive nonblacklash gearing utilized in servomotor operated equipment.

Another object of this invention is to provide an electronic multiplier which does not require matched or selected tubes.

Still another object of this invention is to provide an electronic multiplier which is relatively free of error due to drift and undesired tube non-linearities.

Another object of this invention is the provision of an electronic multiplier which is stabilized, thus reducing drift and providing for increased accuracy and repeatability.

Another object of this invention is the provision of an electronic multiplier wherein the need for manual balancing and alignments is eliminated, thereby affording greater operating convenience, particularly when a large number of multipliers are used in a single installation.

The aforesaid objects of the invention, and other objects which will become apparent as the description proceeds, are achieved by the provision of an electronic multiplier for producing an output voltage signal proportional to the product of at least two variable voltage input signals. In principle, the operation of the invention is based on a method of time-division multiplication. The algebraic product of two voltages is achieved by averaging several cycles of a quasi-rectangular output waveform. The duration and amplitude of alternate portions of the output waveform are functions of the input variables.

For a better understanding of the invention, reference should be had to the accompanying drawings, wherein.

Figure 1:
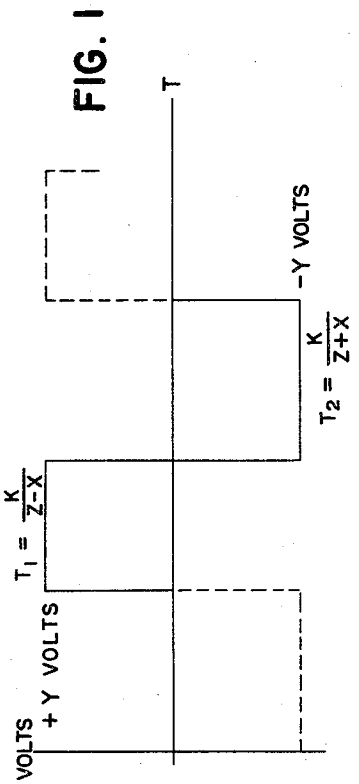
Fig. 1 is a graph of a cycle waveform.

For purposes of illustrating the principles of time-division multiplication; in Fig. 1, assume that the amplitude of the first portion of each cycle is Y, and its duration is $$T_1=\frac{K}{Z-X}$$

where $T_1$ is a time interval, K and Z can be constants, and

X is an input signal. The amplitude of the second portion of each cycle is —Y, and the duration of the second portion is $$T_2=\frac{K}{Z+X}$$

Now it is readily seen that the average value of the amplitude A over both portions is $$A=\frac{YT_1+(-Y)T_2}{T_1+T_2}=Y\left[\frac{T_1-T_2}{T_1+T_2}\right]$$

or, substituting the equations above for the time intervals $T_1$ and $T_2$:

$$A=\frac{1}{Z}(XY)$$

Thus the result is the product of the two input signals X and Y. If desired, the input Z can be a variable signal; the output would then be the product of three input signals: X, Y and 1/Z.

It is understood, of course, that the above basic waveform does not actually appear in the circuits of the invention but only the effecting principle is achieved therein.

In the invention, timing of the output waveform is controlled by a gating device such as an electronic switch, a summing integrator, and an electronic toggle or flip-flop such as a bistable multivibrator. The output of the summing integrator is such that two maximum values are achieved: $e_1$ and $e_2$. When one value is reached, the bistable multivibrator is orientated to one of its stable states, and when the other value is reached, an orientation occurs to the other of its stable states. Two gating devices are utilized in the invention. The first gate is an electronic switch and is coupled to one input signal Z and the second gate is another electronic switch and is coupled to another input signal Y.

When the output of the summing integrator reaches the level $e_2$, the first electronic switch is closed and the input to the summing integrator is $$-\frac{Z}{ab}$$

where $a$ and $b$ are circuit constants. Bypassing the first electronic switch is a connection from the input of electronic switch to the input of the summing integrator whereby the variable signal $$\frac{a}{2ab}$$

is also present at the input of the summing integrator.

The summing integrator is also coupled to another input signal X, which appears at the input to the summing integrator as $$\frac{X}{c}$$

where $c$ is a circuit constant.

Thus the input $I_1$ to the summing integrator when the first electronic switch is in a closed position is $$I_1=\frac{Z}{2ab}-\frac{Z}{ab}+\frac{X}{c}$$
$$=\frac{X}{c}-\frac{Z}{2ab}$$

The summing integrator integrates the above input $I_1$ over the time interval $T_1$, the output of the integrator increasingly linearly with time from $e_2$ to $e_1$. The change in the output of the integrator $M_1$ can be expressed as $$M_1=e_1-e_2=-K\int_0^{T_1}\left[\frac{X}{c}-\frac{Z}{2ab}\right]dt$$

or $$e_1-e_2=-K\left[\frac{X}{c}-\frac{Z}{2ab}\right]T_1 \quad (1)$$

where K is the scale factor associated with the summing integrator.

When the output of the summing integrator reaches the level $e_1$, the first electronic switch is opened and the input $I_2$ to the summing integrator is $$I_2=\frac{X}{c}+\frac{Z}{2ab}$$

The summing integrator integrates the above input $I_2$ over the time $T_2$, the output of the integrator decreasing linearly with the time from $e_1$ to $e_2$. The change in the output of the integrator $M_2$ can be expressed as $$M_2=e_2-e_1=-K\int_0^{T_2}\left(\frac{X}{c}+\frac{Z}{2ab}\right)dt$$

or $$e_2-e_1=-K\left[\frac{X}{c}+\frac{Z}{2ab}\right]T_2 \quad (2)$$

When the output of the summing integrator reaches the level $e_2$, the first electronic switch closes and the above cycles repeats itself.

From the Equations 1 and 2 supra we can express the time intervals of the cycle as:

$$T_1=-\frac{e_1-e_2}{K\left[\frac{X}{c}-\frac{Z}{2ab}\right]} \quad (3)$$

$$T_2=\frac{e_1-e_2}{K\left[\frac{X}{c}+\frac{Z}{2ab}\right]} \quad (4)$$

The action of the flip-flop is such that when the first electronic switch is closed, the second electronic switch is open, and vice versa. Thus, the second electronic switch is open during the time interval $T_1$ and closed during the time interval $T_2$.

The second electronic switch is coupled to a directly-coupled negative-feedback output amplifier. The variable input signal Y is present at the input to the second electronic switch and when the switch is closed (during the time interval $T_2$), the variable input signal Y is present at the input to the output amplifier as $$-\frac{Y}{dk}$$

where $d$ and $k$ are circuit constants. The second electronic switch is bypassed by a coupling between the input to the second electronic switch and the output amplifier. Thus the variable input signal Y is also present at the input to the output amplifier as $$\frac{Y}{2kd}$$

Consequently during the time interval $T_2$, the input $I_3$ to the output amplifier is $$I_3=-\frac{Y}{dk}+\frac{Y}{2kd}=-\frac{Y}{2kd}$$

Likewise when the second electronic switch is open (during the time interval $T_1$), the input $I_4$ to the output amplifier is $$I_4=\frac{Y}{2kd}$$

As a consequence, during the time interval $T_3$ the input $M_3$ to the output amplifier is $$M_3=+\frac{Y}{2kd}$$

and during the time interval $T_1$, the input $M_4$ to the output amplifier is $$M_4=-\frac{Y}{2kd}$$

The average output $M_a$ over the time interval of $T_1$ plus $T_2$ (one cycle) can now be expressed as $$M_a=K_1\left[\frac{Y}{2kd}\,T_2-\frac{Y}{2kd}T_1\right]\frac{1}{T_1+T_2}=\frac{K_1Y}{2kd}\,\frac{T_2-T_1}{T_1+T_2}$$

where $K_1$ is the direct voltage gain of the output amplifier.

As the time intervals $T_1$ and $T_2$ are expressed in Equations 3 and 4 above, the average output $M_a$ can be expressed as $$M_a=\frac{K_1ab}{ckd}\,\frac{XY}{Z}$$

and if the output amplifier is designed so that $$K_1=-\frac{ckd}{ab}$$

the average output $M_a$ will be $$M_a=\frac{XY}{Z}$$

The switching frequency $f$ can be expressed as $$f=\frac{1}{T_1+T_2}=\frac{Kab}{e_1-e_2}\left[\frac{\left(\frac{Z}{2ab}\right)^2-\left(\frac{X}{c}\right)^2}{Z}\right]$$

The entire multiplier can be stabilized against errors due to zero drift by stabilizing the direct voltage amplifiers associated with the two switches, the summing integrator amplifier, and the output amplifier by means well known to the art.

Figure 2:
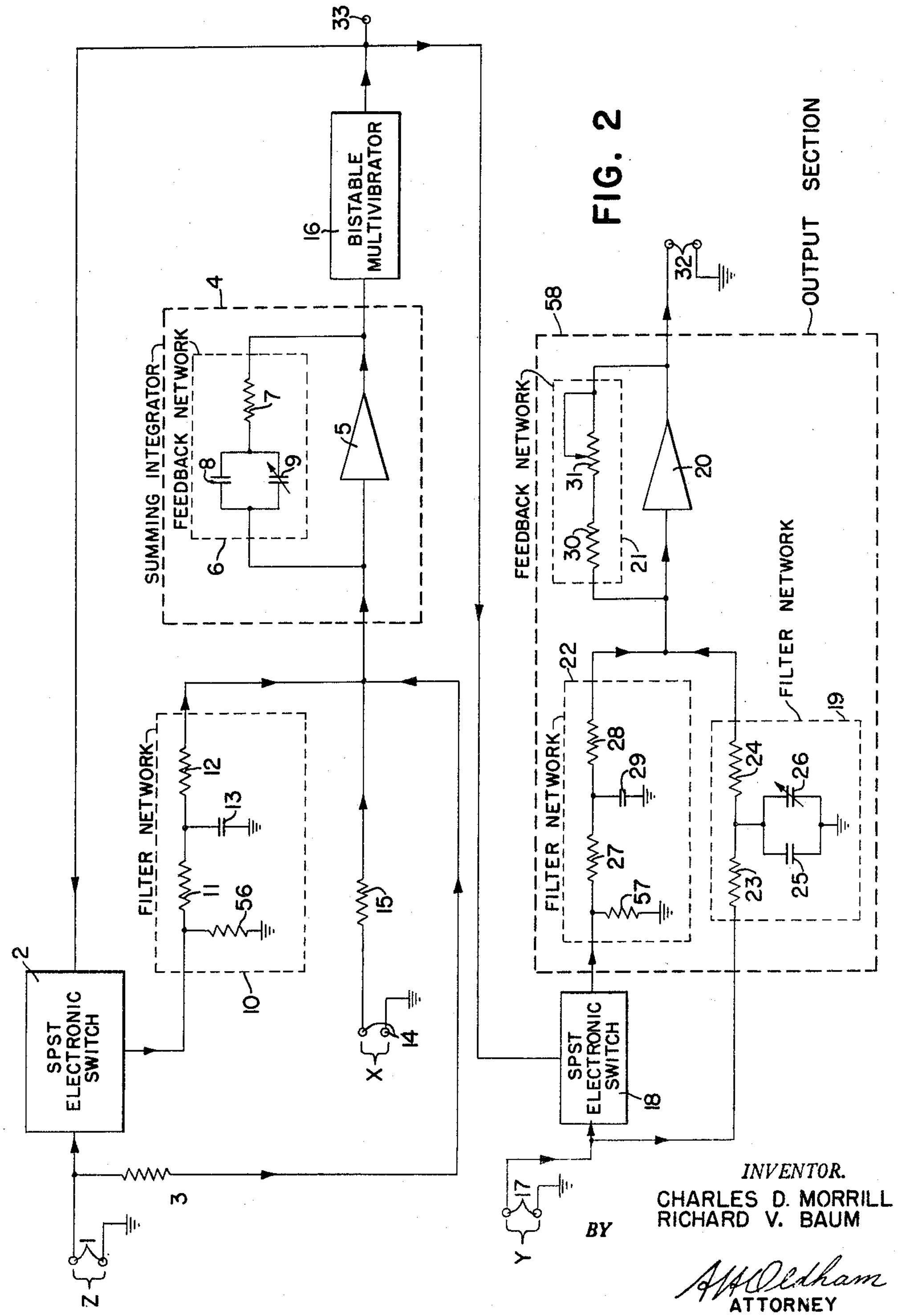
Fig. 2 is a schematic diagram of a single multiplier unit.

With specific reference to the preferred embodiment of the invention illustrated in the above drawings, in Fig. 2: a variable input signal Z is introduced into input terminals 1 which are coupled to a SPST stabilized electronic switch 2, and also coupled through a resistor 3 to the input of a stabilized summing integrator 4. The summing integrator incorporates a stabilized direct-coupled amplifier 5 with an associated feedback network 6, the latter comprising a resistor 7, one end of which is connected to the output of the amplifier 5, and the other end, through two condensers 8 and 9 connected together in parallel, one of fixed value 8 and the other variable 9, connected to the input of the amplifier 5.

The SPST switch 2 is coupled to the input of the summing integrator 4 through a low-pass filter network 10, the latter comprising two resistors 11 and 12 connected ine series, one end of the combination connected to the output of the electronic switch 2 and to ground through a resistor 56, and the other end to the input of the summing integrator 4; the common junction of the two resistances 11 and 12 being connected to ground through a condenser 13.

A variable X is introduced into input terminals 14 which are coupled to the input of the summing integrator 4 through a resistor 15. The output of the summing integrator 4 is coupled to the input of a flip-flop such as a bistable multivibrator 16.

A variable Y is introduced at input terminals 17, which are coupled to another SPST stabilized electronic switch 18. The output of the bistable multivibrator is coupled to the electronic switch 18 and the electronic switch 2.

The input terminals 17 are also connected to an output section 58 which functions as a sign-changing, scale-changing, summing, and filtering means and is formed of a low-pass filter network 22, a low-pass filter network 19, a stabilized output amplifier 20 and its associated feedback network 21. The input terminals 17 are coupled through the filter network 19 to the input of the output amplifier 20 and its associated feedback network 21. The filter network 19 comprises two resistors 23 and 24 connected in series, with one end connected to the output terminals 17 and the other end connected to the input of the output amplifier 20 and its associated feedback network 21; the common junction of the two resistors 23 and 24 being coupled to ground through two parallel condensers 25 and 26, one of fixed value 25 and the other variable 26.

The electronic switch 18 is coupled to the output section 58, being connected to the output amplifier 20 and its associated feedback network 21 through a filter network 22. The filter network 22 comprises two resistors 27 and 28, connected in series, with one end connected to the output from the electronic switch 18 and to ground through a resistor 57, and the other end connected to the input of the output amplifier 20 and its associated feedback network 21; the common junction of the two resistors 27 and 28 being coupled to ground through a condenser 29.

The associated feedback network 21 of the amplifier 20 comprises two resistors 30 and 31, connected in series, one of fixed value 30 and the other variable 31, with one end of the resistor 30 connected to the input of the amplifier 20 and the other free end of the resistor 31 connected to the output of the amplifier 20; the movable element of the variable resistor 31 being also connected to the output of the amplifier 20.

The output of the amplifier 20 and its associated feedback path 21 is connected to output terminals 32.

In order to best illustrate the operation of the invention, assume that the variable signal Z introduced at the input terminals 1 is a positive direct-current potential with a magnitude of Z volts.

The action of the bistable multivibrator 16 is such that during the time $T_1$ the electronic switch 2 is closed (i. e., substantially reproduces the input signal from the input terminals 1, through the electronic switch 2, to the filter network 10). During time $T_1$ we thus have at the input to the filter network 10 a signal $$-\frac{Z}{a}$$

This signal passes through the filter network 10 and is effectively present at the input to the summing integrator 4 as $$-\frac{Z}{ab}$$

The input signal Z also passes through the resistor 3, bypassing the electronic switch 2, and thus is also effectively present at the input to the summing integrator 4 as $$\frac{Z}{2ab}$$

where $a$ and $b$ are circuit constants.

A positive direct-current potential with a magnitude of X volts can be assumed as entering the input terminals 14 and, after passing through the resistor 15, effectively appearing at the input to the summing integrator 4 as $$\frac{X}{c}$$

where $c$ is a circuit constant.

Thus the input to the summing integrator 4 during the time interval $T_1$ is $$\frac{Z}{2ab}-\frac{Z}{ab}+\frac{X}{c}$$

or $$\frac{X}{c}-\frac{Z}{2ab}$$

The summing integrator 4, comprising the direct-coupled amplifier 5 and its associated feedback network 6, integrates the above input over the time interval $T_1$, the change in the output to the bistable multivibrator 16 during the above time interval being $$e_1-e_2=-K\left[\frac{X}{c}-\frac{Z}{2ab}\right]T_1$$

where K is the scale factor previously discussed. The output of the summing integrator 4 increases linearly with time from $e_2$ to $e_1$.

The bistable multivibrator 16 has two stable states and switches to one stable state when the output potential from the summing integrator 4 reaches the level $e_1$, and to the other stable state when the level $e_2$ is reached. During the stable state existent from $e_2$ to $e_1$, the electronic switch 2 is closed and the electronic switch 18 is open; during the stable state existent from $e_1$ to $e_2$, the electronic switch 2 is open and the electronic switch 18 is closed.

Thus when the output from the summing integrator 4 reaches the level $e_1$, the electronic switch 2 will open and remain open as the said output decreases linearly from $e_1$ to $e_2$. During this time interval, $T_2$, the input to the summing integrator 4 consists of the sum of the two signals previously described:

$$\frac{X}{c}$$

and $$\frac{Z}{2ab}$$

and thus the said input is $$\frac{X}{c}+\frac{Z}{2ab}$$

The summing integrator 4 integrates the above input over the time interval $T_2$, the change in the output to the bistable multivibrator 16 being $$e_2-e_1=-K\left[\frac{X}{c}+\frac{Z}{2ab}\right]T_2$$

When the output of the summing integrator 4 reaches the level $e_2$, the bistable multivibrator 16 will shift from one stable state to the other, thus closing the electronic switch 2 and opening the electronic switch 18; the cycle beginning anew and repeating itself.

The electronic switch 18 has at its input the signal Y, assumed as a positive direct-current potential which is introduced at the input terminals 17. When the electronic switch 18 is closed (during the time interval $T_2$), a signal $$-\frac{Y}{d}$$

is present at the input to the output section 58, where $d$ is a circuit constant.

The signal input Y is also bypassed around the electronic switch 18 to the output section 58. From the input to the electronic switch 18, the signal input Y effectively passes to the output section 58.

Thus the effective input to the output amplifier 20 and its associated feedback network 21 can be expressed as being $$-\frac{Y}{dk}+\frac{Y}{2kd}$$

or $$-\frac{Y}{2kd}$$

In similar fashion, when the electronic switch 18 is open the effective input to the output amplifier 20 is $$+\frac{Y}{2kd}$$

As previously shown, the average output is equivalent to the product of the input signals X, Y, and $1/Z$, when the output amplifier 20 is designed such that $$K_1=-\frac{ckd}{ab}$$

Figure 3:
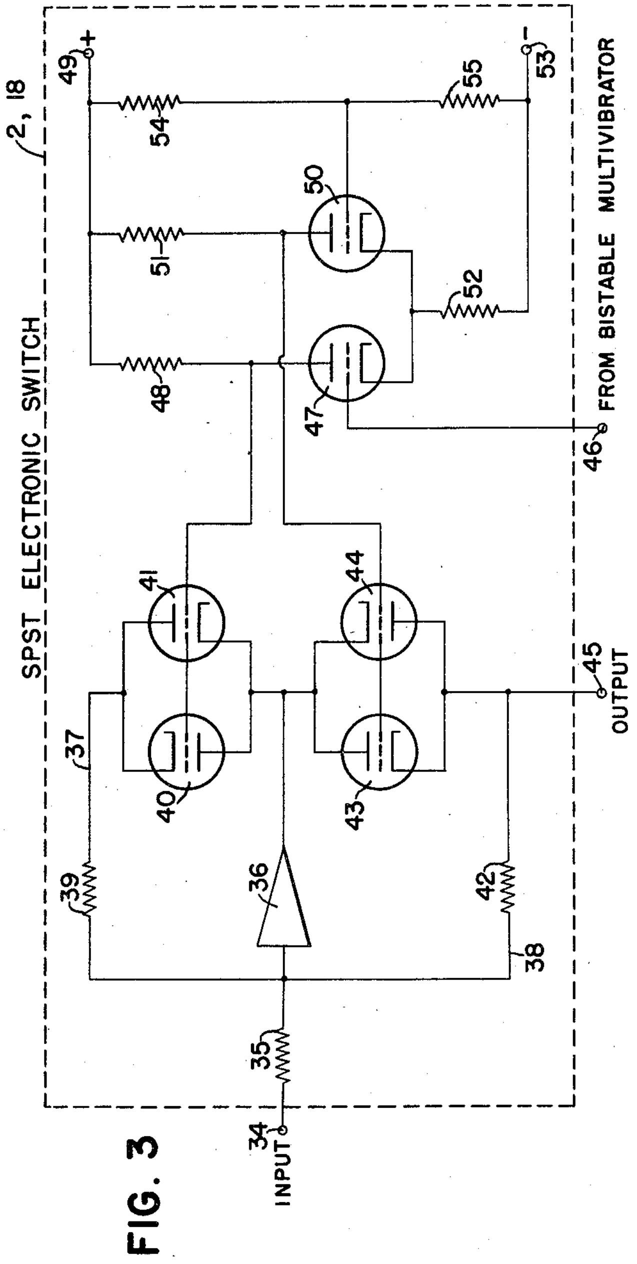
Fig. 3 is a schematic wiring diagram of a SPST (single-pole-single-throw) electronic switch.

The schematic for an electronic switch such as 2 and 18 of Fig. 2, is shown in Fig. 3. The input signal is introduced at an input terminal 34 which is coupled through a resistor 35 to a stabilized direct-coupled amplifier 36. The amplifier 36 has two associated feedback paths 37 and 38.

The feedback path 37 couples the input of the amplifier 36 to the output of the amplifier 36 through a resistor 39 and two triodes 40 and 41, said triodes connected in a boxcar arrangement. The cathode of the triode 41 is connected to the anode of the triode 40, both being connected to the output of the amplifier 36. The cathode of the triode 40 is connected to the anode of the triode 41, both being connected to one end of the resistor 39, the other end of the resistor 39 being connected to the input of the amplifier 36.

The feedback path 38 couples the input of the amplifier 36 to the output of the amplifier 36 through a resistor 42 and two triodes 43 and 44, said triodes being connected in a boxcar arrangement. The cathode of the triode 44 is connected to the anode of the triode 43, both being connected to the output of the amplifier 36. The anode of the triode 44 is connected to the cathode of the triode 43, both being connected to one end of the resistor 42, the other end of the resistor 42 being connected to the input of the amplifier 36. The anode of the triode 44 and the cathode of the triode 43 are also connected to a switch output terminal 45.

An input signal from the bistable multivibrator is introduced at a terminal 46 which is connected to the control electrode of a triode 47. The anode of the triode 47 is connected to the control electrodes of the triodes 40 and 41 and also through a resistor 48 to a terminal 49 whereat a positive direct-current potential is imposed.

The anode of a triode 50 is connected to the control electrodes of the triodes 43 and 44, and also through a resistor 51 to the positive potential terminal 49.

The cathodes of both the triodes 47 and 50 are connected together, the junction of the two cathodes being coupled through a resistor 52 to a terminal 53 whereat a negative direct-current potential is imposed.

The control electrode of the triode 50 is coupled through a resistor 54 to the positive potential terminal 49 and is also coupled through a resistor 55 to the negative potential terminal 53.

During the time interval $T_1$, the bistable multivibrator is in the stable state such that the input to the terminal 46 is positive in sign. Thus the control electrode of the triode 47 is positive in sign and the triode 47 conducts. When the triode 47 conducts, the control electrodes of the triodes 40 and 41 are sufficiently negative with reference to their respective cathodes to prevent conduction through the triodes 40 and 41.

When the triode 47 is conducting, the voltage drop across the resistor 52 is such that the cathode of the triode 50 is more positive with respect to the control electrode of the triode 50 than when the triode 47 is non-conducting. The values of the resistors 48, 51, 52, 54, and 55 are so proportioned that when the triode 47 is conducting, the triode 50 is non-conducting and vice versa. When the triode 50 is non-conducting, the control electrodes of the triodes 43 and 44 are sufficiently positive to cause either triode 43 or triode 44 or both to conduct.

Thus when the bistable multivibrator is in the positive stable state during the time interval $T_1$, the feedback path 38 for the amplifier 36 is in operation and an output signal, which is a function of the input signal at the input terminal 34, is present at the output terminal 45.

During the time interval $T_2$, the bistable multivibrator is in the stable state such that the input to the terminal 46 is negative in sign. Thus the control electrode of the triode 47 is negative in sign and the triode 47 is non-conducting. When the triode 47 is non-conducting, the control electrodes of the triodes 40 and 41 are sufficiently positive to cause either triode 40 or triode 41 or both to conduct.

When the triode 47 is non-conducting, the triode 50 is conducting, thus placing a sufficiently negative potential on the control electrodes of the triodes 43 and 44, to prevent conduction of the triodes 43 and 44. As a consequence the triodes 43 and 44 are non-conducting.

Thus when the bistable multivibrator is in the negative stable state during the time interval $T_2$, the feedback path 37 for the amplifier 36 is in operation and since the feedback path 38 is inoperative, no signal is present at the output terminal 45 during the time $T_2$.

As a result of the above sequence, the circuit acts in such manner as to substantially reproduce at the terminal 45 the input signal during a time interval $T_1$, and to produce a ground potential at the terminal 45, during the time interval $T_2$, whereby a switching action is maintained.

The apparatus may be compounded by coupling additional similar electronic switches and modifying networks to a terminal 33 of Fig. 2. Thus more variables can be introduced to extend the capacity of the multiplier.

It will be recognized that the apparatus of the invention can be utilized to perform division as well as multiplication. This is so because of the inherent similarity of the two operations. For example, if it is desired to divide X by Y, the result will be the same if the multiplication of X by W is performed, where W is equal to the reciprocal of Y.

While certain representative embodiments and details have been shown for the purpose of illustrating the invention, it will be apparent to those skilled in this art that various changes and modifications may be made therein without departing from the spirit or scope of the invention.

We claim:

1. An electronic system for performing multiplying operations comprising a first direct-coupled amplifier adapted to receive a first input signal and a second input signal, a feedback circuit paralleling the first direct-coupled amplifier and including a resistor and a variable condenser in series-connection, the first direct-coupled amplifier and the feedback circuit constituting a summing integrator, a bistable multivibrator the input of which is coupled to the output of the first direct-coupled amplifier, a first filter network, a first single-pole-single-throw electronic switch adapted to receive and modify the first input signal, the output of said first switch being coupled to the input of the first direct coupled amplifier through the first filter network, connecting means between the output of the bistable multivibrator and the first electronic switch so that the change in state of the output signal of the bistable multivibrator closes and opens said electronic switch, a second single-pole-single-throw electronic switch adapted to receive and modify a third input signal, connecting means between the output of the bistable multivibrator and the second electronic switch whereby the change in state of the output signal of the bistable multivibrator closes and opens said electronic switch in opposite phasing to the action of the first electronic switch, a second and third filter network, a direct-coupled negative-feedback output amplifier adapted to receive the output of the second electronic switch through the second filter network and the third input signal through the third filter network, the average signal from the output amplifier being representative of the product of the reciprocal of the first input signal, the second input signal, and the third input signal.

2. An electronic system for performing multiplying operations comprising a bistable multivibrator, a summing integrator adapted to receive a first and second input signal and the output of which is coupled to the input and controls the actions of the bistable multivibrator, a first filter network, a first single-pole-single-throw electronic switch adapted to receive and modify the first input signal and the output of which is coupled to the input of the summing integrator through the first filter network, connecting means between the output of the bistable multivibrator and the first electronic switch so that the change in state of the output signal of the bistable multivibrator closes and opens said electronic switch, a second single-pole-single-throw electronic switch adapted to receive and modify a third input signal, connecting means between the output of the bistable multivibrator and the second electronic switch so that the change in state of the output signal of the bistable multivibrator closes and opens said electronic switch in opposite phasing to the action of the first electronic switch, a second filter network, a direct-coupled negative-feedback output amplifier adapted to receive the third input signal through the second filter network, and a third filter network connected in series between the output of the second electronic switch and the input of the output amplifier, the average signal from the output amplifier being representative of the product of the reciprocal of the first input signal, the second input signal, and the third input signal.

3. An electronic system for performing multiplying operations comprising a first switching means adapted to receive and modify a first input signal, a flip-flop producing oppositely orientated impulses, a first filter network, summing and integrating means the input of which is coupled to the output of the first switching means through the first filter network and the output of which is coupled to and controls the action of the flip-flop, said summing and integrating means being adapted to receive the first input signal and a second input signal, a second switching means adapted to receive and modify a third input signal, a second and third filter network, amplifying means the input of which is coupled to the output of the second switching means through the second filter network and to the third input signal through the third filter network, and connecting means from the flip-flop to the first and second switching means so that when the first switching means is conducting the first input signal in modified form, the second switching means is not conducting the third input signal, and when the first switching means is not conducting the first input signal, the second switching means is conducting the third input signal in modified form, thus producing an average signal at the output of the amplifying means.

4. An electronic system for performing multiplying operations comprising a first switching means adapted to receive and modify a first input signal, a second switching means adapted to receive and modify a second input signal, a flip-flop with the output of the flip-flop coupled to the first and second switching means so that when a signal of one orientation is received from the flip-flop by the first and second switching means, the first input signal is modifiedly passed through the first switching means and the second input signal is not passed through the second switching means, and when a signal of the opposite orientation is received from the flip-flop by the first and second switching means, the first input signal is not passed through the first switching means and the second input signal is modifiedly passed through the second switching means, summing and integrating means adapted to receive the first input signal, a third input signal, and the output of the first switching means, the output of said summing and integrating means being coupled to the input of the flip-flop and controlling the flip-flop action thereof, output means connected to the second input signal and the output of the second switching means for producing an average output signal.

5. An electronic system for performing multiplying operations comprising a first direct-coupled amplifier adapted to receive a first and second input signal, a feedback circuit paralleling the first direct-coupled amplifier and including a resistor and a variable condenser in series-connection, the first direct-coupled amplifier and the feedback circuit constituting a summing integrator, a bistable multivibrator the input of which is coupled to the output of the first direct-coupled amplifier, a first and second electronic switch adapted to receive the first input signal and a third input signal respectively, and each switch including a direct-coupled amplifier with a pair of feedback circuits paralleling said amplifier and each feedback circuit including a feedback resistor connected in series with a first pair of electron discharge devices each having at least an anode, a cathode, and a control electrode, with the anode of each discharge device connected to the cathode of the other discharge device, and each switch having a second pair of electron discharge devices each having at least an anode, a cathode, and a control electrode, with each anode of the second pair of discharge devices separately coupled to the corresponding control electrode of first pair of discharge devices and so biased and arranged that a change to one state of an input signal from the bistable multivibrator to the control electrode of one of the second pair of discharge devices will render one of the feedback paths conductive and the other non-conductive, and a change to the other state of an input signal from the bistable multivibrator will reverse the conductivity of the said feedback paths, a first filter network connected in series between the output of the first electronic switch and the input to the summing integrator, a second and third filter network, a direct-coupled negative feedback output amplifier adapted to receive the output of the second electronic switch through the second filter network and the third input signal through the third filter network, the average output signal from the output amplifier being representative of the product of the reciprocal of the first input signal, the second input signal, and the third input signal.

6. An electronic system for performing multiplying operations comprising a first direct-coupled amplifier adapted to receive a first and second input signal, a feedback circuit paralleling the first direct-coupled amplifier and including a resistor and a variable condenser in series-connection, the first direct-coupled amplifier and the feedback circuit constituting a summing integrator, a bistable multivibrator the input of which is coupled to the output of the first direct-coupled amplifier, a first and second electronic switch adapted to receive and modify the first input signal and a third input signal respectively, and each switch including a direct-coupled amplifier with a pair of feedback circuits paralleling said amplifier and each feedback circuit including a feedback resistor connected in series with a first pair of electron discharge devices each having at least an anode, a cathode, and a control electrode, with the anode of each discharge device connected to the cathode of the other discharge device, and each switch having a second pair of electron discharge devices each having at least an anode, a cathode, and a control electrode, with each anode of the second pair of discharge devices separately coupled to the corresponding control electrode of first pair of discharge devices and so biased and arranged that a change to one state of an input signal from the bistable multivibrator to the control electrodes of one of the second pair of discharge devices will render one of the feedback paths conductive and the other non-conductive, and a change to the other state of an input signal from the bistable multivibrator will reverse the conductivity of the said feedback paths, a first filter network connected in series between the output of the first electronic switch and the input to the summing integrator, output means adapted to receive the third input signal and coupled to the output of the second electronic switch, said output means producing an average output signal which is representative of the product of the reciprocal of the first input signal, the second input signal, and the third input signal.

7. An electronic system for performing multiplying operations comprising a first and second switching means adapted to receive and modify a first and second input signal respectively, and each of the switching means including amplifying means with gating means in the output of the amplifying means and feedback means paralleling both the amplifying means and the gating means, said feedback means arranged so as to operate regardless of the opening and closing of the gating means, actuating means alternately rendering the first and second switching means conductive with reference to their respective input signals, summing and integrating means adapted to receive the first input signal, a third input signal, and the output of the first switching means, the output of the summing and integrating means being coupled to the actuating means and controlling the timing of the impulse emanating from the actuating means, and output means adapted to receive the second input signal and coupled to the output of the second switching means, said output means producing an average output signal which is representative of the product of the reciprocal of the first input signal, the second input signal, and the third input signal.

8. An electronic switch comprising an input terminal, a direct-coupled amplifier, a resistor connecting the input terminal with the amplifier, a first and second electron discharge device each having at least an anode, a cathode, and a control electrode, a first and second feedback resistor, a first feedback circuit paralleling the direct-coupled amplifier and including the first and second electron discharge devices and the first feedback resistor, with the anode of each of the said discharge devices connected to the cathode of the other discharge device, and the first feedback resistor series-connected to the combination of the first and second electron discharge devices, a third and fourth electron discharge device each having at least an anode, a cathode, and a control electrode, a second feedback circuit paralleling the direct-coupled amplifier and including the third and fourth electron discharge devices and the second feedback resistor, with the anode of each of the said discharge devices connected to the cathode of the other discharge device, and the second feedback resistor series-connected to the combination of the third and fourth electron discharge devices, a fifth and sixth electron discharge device each having at least an anode, a cathode, and a control electrode, coupling means between the anode of the fifth electron discharge device and the control electrodes of the first and second electron discharge devices, and the control electrode of the fifth electron discharge device coupled to a source of oppositely-poled voltages, coupling means between the anode of the sixth electron discharge device and the control electrodes of the third and fourth electron discharge devices, and with a source of biasing potential coupled to the interconnected cathodes of the fifth and sixth electron discharge device and to the interconnected anodes of the fifth and sixth electron discharge devices and to the control electrode of the sixth electron discharge device, and an output terminal connected between the second feedback resistor and the third and fourth electron discharge devices so that when an input signal of one polarity is received at the control electrode of the fifth discharge device, the third and fourth electron discharge devices are non-conducting and either the first or the second electron discharge devices or both are conducting, and thus no signal is present at the output means, and when an input signal of the opposite polarity is received at the control electrode of the fifth discharge device, either the third or fourth electron discharge devices or both are conducting and the first and second electron discharge devices are non-conducting, and a signal is present at the output means.

9. An electronic switch comprising an input terminal, a direct-coupled amplifier, a resistor connecting the input terminal with the amplifier a first and second feedback circuit paralleling the amplifier, each feedback circuit including a feedback resistor connected in series with a first and second pair, respectively, of electron discharge devices each having at least an anode, a cathode, and a control electrode, and within each pair of electron discharge devices the anodes and cathodes being interconnected, a fifth and sixth electron discharge device each having at least an anode, a cathode, and a control electrode, with the anodes of the fifth and sixth discharge devices coupled to the control electrodes of the first and second pair of discharge devices, respectively, and the control electrode of the fifth discharge device coupled to a source of oppositely-poled voltages, and with a source of biasing potential coupled to the interconnected cathodes of the fifth and sixth discharge devices, and the interconnected anodes of the fifth and sixth discharge devices and the control electrode of the sixth discharge device, and an output terminal coupled to the feedback path incorporating the second pair of discharge devices, so that when an input signal of one polarity is received at the control electrode of the fifth discharge device, the second pair of discharge devices are non-conducting and either or both the first pair of discharge devices are conducting and no signal is present at the output means, and when an input signal of the opposite polarity is received at the control electrode of the fifth discharge device, either or both the second pair of discharge devices are conducting and the first pair of discharge devices are non-conducting and a signal is present at the output means.

10. An electronic switch comprising a direct-coupled amplifier adapted to receive an input signal, a first and second electron discharge device each having at least an anode, a cathode, and a control electrode, a first and second feedback resistor, a first feedback circuit paralleling the direct-coupled amplifier and including the first and second electron discharge devices and the first feedback resistor, with the anode of each discharge device connected to the cathode of the other discharge device, series-connecting means between the first feedback resistor and the combination of the first and second electron discharge devices, a third and fourth electron discharge device each having at least an anode, a cathode, and a control electrode, a second feedback circuit paralleling the direct-coupled amplifier and including the third and fourth electron discharge devices and the second feedback resistor, with the anode of each discharge device connected to the cathode of the other discharge device, series-connecting means between the second feedback resistor and the combination of the third and fourth electron discharge devices, output means coupled to the second feedback circuit, and actuating means coupled to the control electrodes of the first, second, third, and fourth electron discharge devices, so that during a first phase of the actuating means either the first or second electron discharge devices or both are conducting and the third and fourth electron discharge devices are non-conducting and no signal is present at the output means, and during a second phase of the actuating means the first and second electron discharge devices are non-conducting and either the third or fourth electron discharge devices or both are conducting and a signal is present at the output means.

11. An electronic switch comprising an input terminal, a stabilized direct-coupled amplifying means, a resistance connecting the input terminal to the amplifying means, a first gating means, a first feedback circuit paralleling the amplifying means and including the first gating means, a second gating means, a second feedback circuit paralleling the amplifying means and including the second gating means, output means coupled to the second feedback circuit, and means alternately rendering the first and second gating means conductive.

References Cited in the file of this patent

UNITED STATES PATENTS

| | | |
|---|---|---|
| 2,300,133 | Nyquist | Oct. 27, 1942 |
| 2,471,262 | Cousins | May 24, 1949 |
| 2,482,973 | Gordon | Sept. 27, 1949 |
| 2,511,197 | Darlington et al. | June 13, 1950 |
| 2,548,449 | Staub | Apr. 10, 1951 |
| 2,599,675 | Volz | June 10, 1952 |
| 2,658,997 | Carbrey et al. | Nov. 10, 1953 |